Nov. 2, 1926.

F. J. JOYCE 1,605,590

DIE HOLDER FOR PHONOGRAPH RECORD MOLDS

Filed March 19, 1926

Inventor:
Francis J. Joyce.
by his atty.

Patented Nov. 2, 1926.

1,605,590

UNITED STATES PATENT OFFICE.

FRANCIS J. JOYCE, OF BOSTON, MASSACHUSETTS.

DIE HOLDER FOR PHONOGRAPH-RECORD MOLDS.

Application filed March 19, 1926. Serial No. 95,845.

This invention relates to a mold for phonograph records and particularly to a novel construction of die holder employed in said mold.

In the process of molding phonograph records, the material of which the records is composed is placed in a plastic mass upon the central portion of a matrix located upon the lower member of the mold. The members of the mold are then forced together, a pressure of several thousand pounds per square inch being applied, and while the material is subjected to this pressure, steam is circulated through the die holders for a sufficient period to soften the material and cause the latter to fill the grooves of the matrix. The steam is then shut off and the material is cooled by circulating cold water through the holders, said water passing through the same passages which formerly contained the heating fluid.

In order that this process shall be consummated in the highly efficient manner, and a maximum production of records procured, it is imperative that the members of the mold shall be absolutely rigid in order that the finished record will be perfectly flat and true, and the passages for the heating and cooling fluids shall be so distributed through the die holders that the latter may be alternately heated and cooled in the shortest period of time possible.

With this end in view it is the object of this invention to provide a device having a pair of die holders of strong construction, particularly at the center thereof where the pressure is the greatest and where there is usually a tendency for the holders to buckle slightly, said die holders having heating members formed from a solid piece of metal, the fluid passages for the heating and cooling mediums being formed by drilling inwardly from opposite sides of the periphery of the heating member, so that the opposite end portions of each passage will meet at an angle and at a point midway the length of said passage; a portion free from fluid passages being provided extending diametrically across the member and tapering in width radially in opposite directions toward the periphery of said member.

The invention consists in a die holder for molds as set forth in the following specification and particularly as pointed out in the claims thereof.

Referring to the drawings:—

Like numerals refer to like parts throughout the several views of the drawings.

Figure 1:
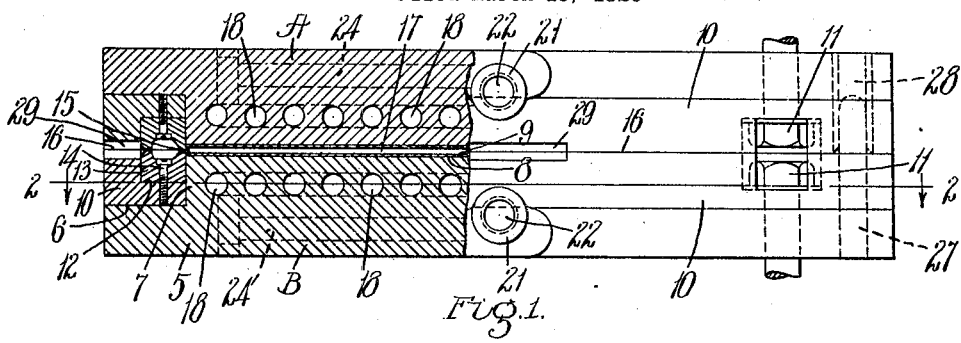
Figure 1 represents a partial central vertical section of a pair of co-operating die holders for a phonograph record mold embodying my invention.
Figure 2:
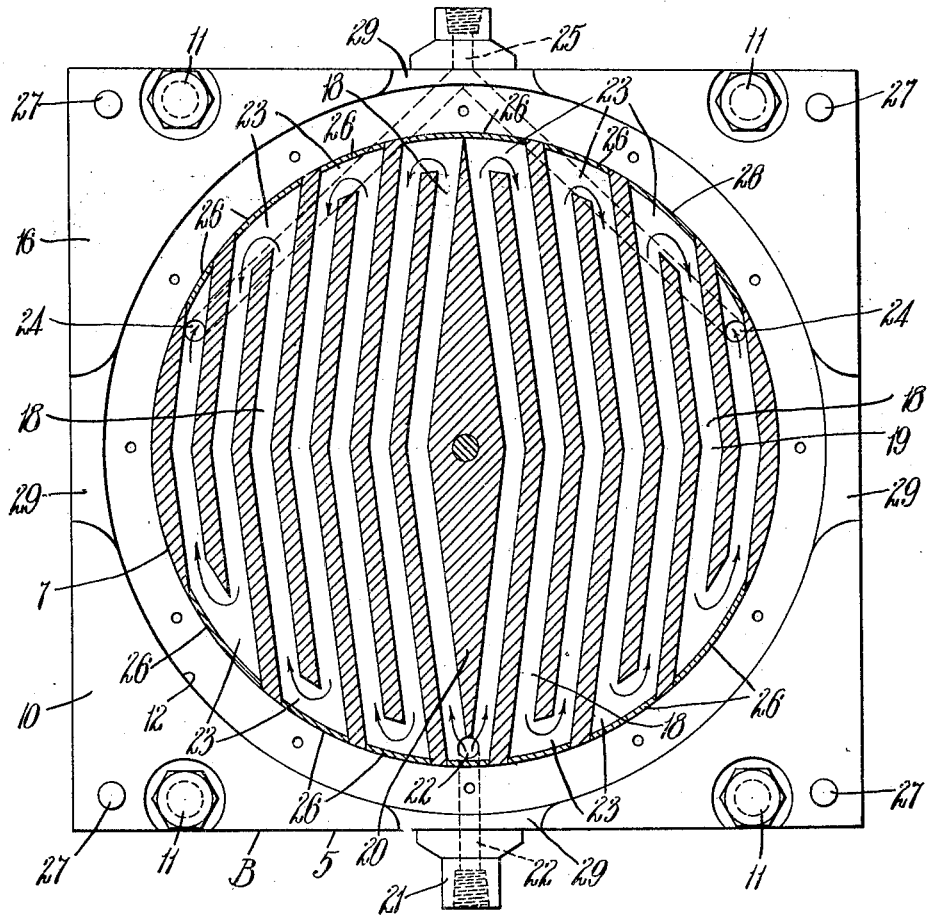
Fig. 2 is a horizontal sectional plan view taken on the line 2—2 of Figure 1.

In the drawings, A and B represent the upper and lower die holders respectively of a phonograph record mold, each of said holders being substantially identical in construction and co-operating one with another to form a phonograph record therebetween. The members A and B each embody therein a heating member 5 formed from a solid piece of metal. The lower portion of the member 5 is rectangular in form, a shouldered portion 6 being provided midway the height of said member and thereby forming a central circular raised portion 7 at the top of which is a flat surface 8 upon which a matrix 9 is clamped.

Resting upon the shouldered portion 6 of the heating member 5 and extending entirely around the circular raised portion 7 thereof is a shell 10, and said shell is securely clamped to the heating member 5 by a plurality of bolts 11, the latter also being utilized to clamp the die holder to the ram of a hydraulic press. The shell 10 is provided with an annular recess 12 for the reception of a ring 13, the latter being secured to the shell 10 by a plurality of screws 14. The ring 13 has a lip 15 extending entirely therearound, said lip projecting over the edge of the matrix 9 and thereby clamping said matrix to the surface 8 of the heating member 5. A flat surface 16 of the shell 10 is so formed and positioned that when the upper and lower members A and B respectively of the mold are forced together, the adjacent surfaces 16 of each shell will abut against each other as illustrated in Figure 1, and a space 17 is thereby provided between the adjacent surfaces of the matrices held by the upper and lower holders, and it is in this space 17 that the phonograph record is molded.

The material of which the phonograph record is constructed is placed in a plastic mass at the center of the matrix 9 located upon the lower die holder B and when the holders are forced together this material is spread out and pressed between the matrices and the entire space 17 filled, the excess of material being forced out through a narrow space between the adjacent lips 15 of the rings 13.

The die holders are preferably heated by steam, and in order to conduct this steam to all parts of the heating member 5 a plurality of passages 18 are formed extending across the raised portion 7 of said heating member and said passages are formed by drilling inwardly from opposite sides of the heating member in such a manner that the opposite end portions of the passages meet at an angle at 19 midway the length of said passage. The passages, furthermore, are so formed and spaced in the heating member that a central solid portion 20 is provided extending diametrically across said heating member, and said central portion has a maximum width at the center of said member and tapers in width radially in opposite directions toward the periphery of said member.

The heating fluid enters the heating member 5 at 21 flowing through a passage 22 and discharging into the two innermost passages 18 at one end of the diametrically extending central portion 20, one half of said fluid flowing to one side of said portion 20 and the other half of said fluid flowing to the other side of said portion 20, and said central portion is therefore exposed to the steam first. Adjacent passages 18 are connected alternately at their opposite ends at 23 and the heating fluid entering the heating member 5 through the passage 22 circulates back and forth through said heating member, passing outwardly therefrom through passages 24 located upon opposite sides of the heating member, said passages 24 finally uniting at 25 at the opposite side of the heating member from the entrance passage 22.

After the passages 18 have been drilled and the connecting passages 23 have been formed, the openings in the sides of the heating member are permanently closed by inserts 26 which are welded to said heating member in a manner to in effect form a single solid piece of metal.

In the process of molding the record, after the steam has been allowed to circulate through the members 5 for a predetermined period, said steam is shut off and cold water is caused to flow through the passages 18 and circulate through said members 5 for a sufficient period to reduce the temperature of said members and thereby cause the material comprising the records to harden.

The upper and lower portions A and B of the mold are held in perfect alignment with each other by a plurality of pins 27 which are rigidly fastened in the lower member B and project into openings 28 in the upper member A. The excess of material which is forced out from the space 17, when the members of the mold are forced together and which first passes through a narrow space provided between the lip portions 15 of the rings 13, may finally pass outwardly from the mold between the opposite shells 10 through spaces 29 provided upon each side thereof.

By forming the heating members 5 with a central circular raised portion 7, and by drilling the passages from opposite sides of said circular portion inwardly at an angle, so that the opposite end portions of said passages meet at an angle at a point midway the length of said passage, an unusually strong construction of heating member is provided for the reason that the diametrically extending central portion that is formed has a maximum thickness at the center of the heating member where the greatest amount of strength is needed, and this diametrically extending portion forms a division so that the heating and cooling fluids pass upon opposite sides thereof, heating and cooling the center of the member first where the wall is the thickest, and then passing toward opposite sides of said heating member. By drilling the passages 18 inwardly from opposite sides of the heating member it is possible to make the latter from a solid piece of metal, and furthermore, the drilled holes form an arched construction above and between said passages which provides a very strong construction.

By dividing each heating member into two parts and directing the heating and cooling fluids to opposite sides of said heating member, said fluids are caused to circulate more rapidly through the heating member and the latter is, therefore, quickly heated and cooled, and the production of records is greatly increased.

I claim:

1. A die holder for molds having a heating member provided with a surface adapted to hold a matrix and embodying therein a central solid portion tapering in width radially in opposite directions toward the periphery of said member, the latter also being provided with a plurality of fluid passages extending thereacross upon opposite sides of said central portion and parallel thereto.

2. A die holder for molds having a heating member provided with a surface adapted to hold a matrix and embodying therein a central solid portion tapering in width radially in opposite directions toward the periphery of said member, the latter also being provided with a plurality of fluid passages extending thereacross upon opposite sides of said central portion, the opposite end portions of each passage meeting at an angle midway the length of said passage.

3. A die holder for molds having a heating member provided with a surface adapted to hold a matrix and embodying therein a solid portion extending diametrically thereacross having a maximum width at the center thereof and tapering in width in opposite directions toward the periphery of said member, the latter also being provided with a plurality of fluid passages extending thereacross upon opposite sides of said central portion and parallel thereto.

4. A die holder for molds having a heating member formed from a solid piece of metal and provided with a surface adapted to hold a matrix and embodying therein a central solid portion tapering in width radially in opposite directions toward the periphery of said member, the latter also being provided with a plurality of arched fluid passages extending thereacross upon opposite sides of said central portion and parallel thereto.

5. A die holder for molds having a heating member provided with a circular raised portion having a top surface adapted to hold a matrix, said circular portion embodying therein a centrally disposed solid portion extending diametrically thereacross and tapering in width in opposite directions toward the periphery of said circular portion, the latter also being provided with a plurality of fluid passages extending thereacross upon opposite sides of said central portion the opposite end portions of each passage meeting at an angle midway the length of said passage.

6. A die holder for molds comprising, in combination, a heating member in one piece and provided with a circular raised portion having a flat surface and provided with a plurality of intercommunicating fluid passages extending thereacross, a shell fast to said heating member and surrounding said raised portion, and a ring fast to said shell and adapted to clamp a matrix upon said flat surface.

7. A die holder for molds comprising, in combination, a heating member provided with a circular raised portion having a flat surface and provided with a plurality of intercommunicating fluid passages extending thereacross, said passages having an arched upper wall, the opposite end portions of said passages meeting at an angle midway the length of said passage, a shell fast to said heating member and surrounding said raised portion, and a ring fast to said shell and adapted to clamp a matrix upon said flat surface.

In testimony whereof I have hereunto set my hand..

FRANCIS J. JOYCE.